United States Patent [19]

Stockmar et al.

[11] Patent Number: 4,683,997
[45] Date of Patent: Aug. 4, 1987

[54] TEMPERATURE COMPENSATING FLUID FRICTION CLUTCH

[75] Inventors: Jürgen Stockmar, Graz; Karl Friedrich, Leibnitz, both of Austria

[73] Assignee: Steyr-Daimler-Puch AG, Vienna, Austria

[21] Appl. No.: 821,028

[22] Filed: Jan. 21, 1986

[30] Foreign Application Priority Data

Jul. 2, 1985 [AT] Austria .................................. 1960/85

[51] Int. Cl.⁴ ........................ F16D 35/00; F16D 43/25
[52] U.S. Cl. ................................. 192/58 C; 192/82 T; 192/70.28
[58] Field of Search ................. 192/58 C, 82 T, 58 B, 192/57, 70.28

[56] References Cited

U.S. PATENT DOCUMENTS

| | | |
|---|---|---|
| 1,238,447 | 8/1917 | Severy . |
| 2,217,357 | 10/1940 | Coe .................................... 192/70.28 |
| 3,261,230 | 7/1966 | Rudnicki ....................... 192/82 T X |
| 3,584,720 | 6/1971 | Bark .................................. 192/70.28 |
| 3,613,848 | 10/1971 | Reiff ................................. 192/70.28 |
| 3,624,769 | 11/1971 | Hansen ............................. 192/85 AA |
| 3,913,713 | 10/1975 | Geppert ......................... 192/82 T X |
| 3,923,113 | 12/1975 | Pagdin ........................... 192/82 T X |
| 4,031,780 | 6/1977 | Dolan et al. ................... 192/58 C X |
| 4,040,271 | 8/1977 | Rolt et al. ...................... 192/82 T X |
| 4,058,027 | 11/1977 | Webb ............................. 192/58 C X |
| 4,425,994 | 1/1984 | Schele ............................ 192/85 AA |
| 4,548,306 | 10/1985 | Hartz ................................ 192/70.28 |

FOREIGN PATENT DOCUMENTS 2453562  5/1976  Fed. Rep. of Germany .... 192/82 T
1412583  11/1975  United Kingdom .

OTHER PUBLICATIONS

*International Copper Research Association, Inc.*, No. 10, (Feb. 1980), pp. 1-5.
Michael, A. D. et al., "SME Brass—A New Engineering Material", *The Metallurgist and Materials Technologist*, vol. 12, No. 8, (Aug. 1980).

Primary Examiner—Rodney H. Bonck
Assistant Examiner—Richard M. Lorence
Attorney, Agent, or Firm—Marmorek, Guttman & Rubenstein

[57] ABSTRACT

A temperature compensating fluid friction clutch is disclosed. The fluid friction clutch comprises a housing substantially filled with a viscous fluid, a shaft disposed within the housing, and mutually interengaging inner and outer plates connected to the shaft and housing for rotation about an axis within the housing. Spacers are located in the gaps between the plates, while the plates are axially displaceable so as to vary the size of the gaps. Temperature responsive elements are also provided to compensate for any reduction in the fluid viscosity when the temperature of the fluid rises. The temperature responsive elements, which may be in various forms, act to decrease the size of the gaps between the inner and outer plates when the temperature of the viscous fluid rises. In one embodiment, the temperature responsive elements comprise an expansion element connected to the inner and outer plates and which expands upon an increase in temperature. In another embodiment, the spacers comprise the temperature responsive elements. In this embodiment, the spacers are in the form of bimetallic conical rings which contract in an axial direction upon an increase in temperature.

7 Claims, 3 Drawing Figures

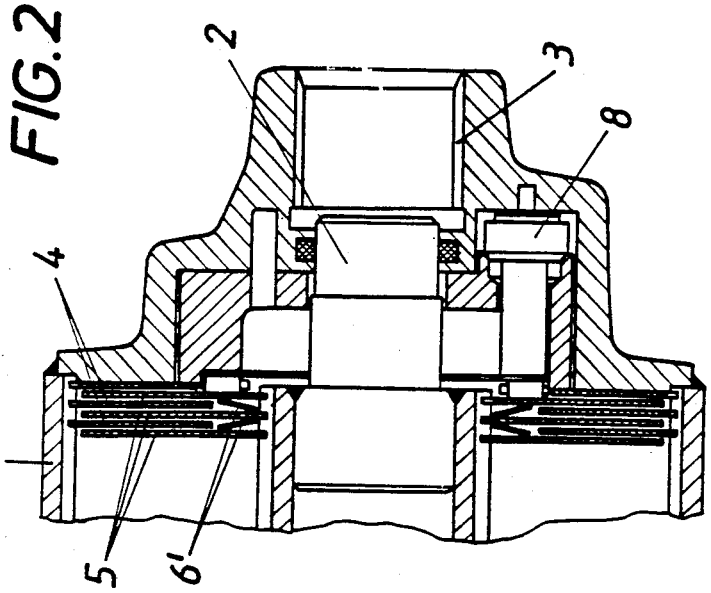
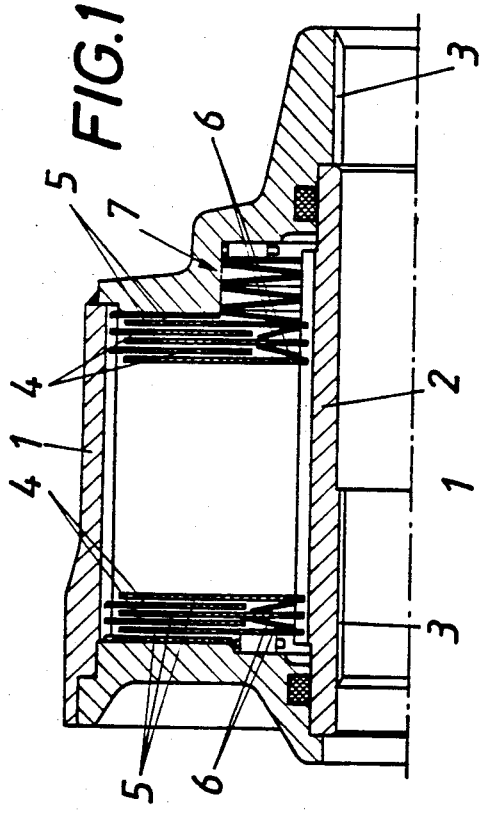
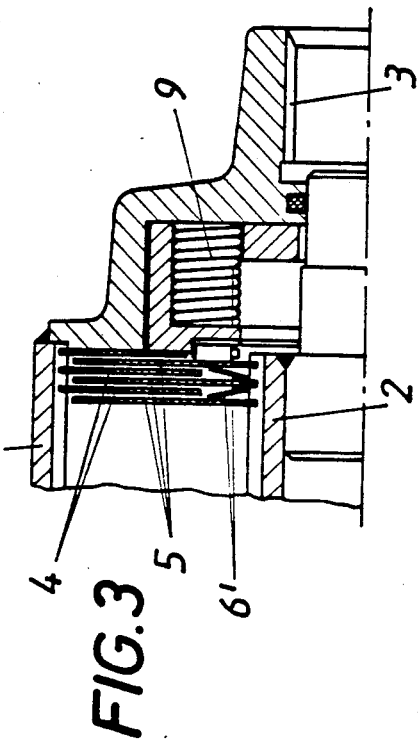

TEMPERATURE COMPENSATING FLUID FRICTION CLUTCH

BACKGROUND OF THE INVENTION

The present invention relates to a fluid friction clutch. More particularly, the present invention relates to a fluid friction clutch having a housing filled with a viscous fluid, a shaft projecting into the housing, interengaging plates non-rotatably connected to the housing and the shaft, and spacers disposed in the gaps between the plates. The plates are displaceable in the axial direction so that the magnitude of the gaps between the plates can be varied.

In fluid friction clutches of this type, torque is transmitted by the shearing stresses which arise in the viscous fluid contained within the gaps between the interengaging plates. The magnitude of these shearing stresses depends upon the viscosity of the fluid and the velocity gradient between the two sets of plates. One of the problems associated with such fluid friction clutches is the lowering of the viscosity of the fluid, and consequently the drop in transmittable torque, when the temperature of the viscous fluid rises. Such increases in the temperature of the viscous fluid may arise from slippage in the clutch or from an external heat source.

The drop in transmittable torque can be compensated for by increasing the velocity gradient, i.e., by increasing the difference in rotational speeds between the driving and the driven coupling parts. Alternatively, the decrease in transmittable torque can be compensated for by decreasing the size of the spacings or gaps between the plates.

In many cases, it is not possible, or at least not desirable, to increase the differential speed between the driving and the driven parts of the clutch units. Therefore, in order to compensate for the loss in transmittable torque, it is desirable to adjust the magnitude of the gaps between the plates when the temperature of the viscous fluid changes.

A number of fluid friction clutches are already known in which the spacings between the plates can be varied. For example, in U.S. Pat. No. 1,238,447 (Severy), a friction clutch is described having a plurality of coaxial ring lugs which serve as the mutually interengaging coupling members. These ring lugs are conically shaped. Each set of ring lugs is aligned with and offset from the gaps between the ring lugs of the other set. The ring lugs are caused to interengage when the disks to which they are attached are displaced. Due to the conical shape of the inner and outer peripheral surfaces of the ring lugs, a different gap width results between the ring lugs, the gap width depending upon the depth of penetration of the ring lugs. Thus, it is possible to vary the magnitude of the transferrable torque in the clutch disclosed in this patent by varying the magnitude of the gaps between the ring lugs which function as the coupling members. However, this patent does not disclose varying the gaps between the ring lugs in accordance with temperature variations in the viscous fluid.

In British Pat. No. 1,412,583 (Rolt et al.), a fluid friction clutch of a different kind is described. In the fluid friction clutch of this patent, gaps are provided between interengaging inner and outer plates and spacers are disposed within these gaps. However, the spacers disclosed in this patent are simple wire rings. No provision is made in this patent for adjusting the gap width between the plates.

It is therefore an object of the present invention, to provide a fluid friction clutch having mutually interengaging plates wherein the size of the gaps between the plates is independently and automatically regulated in accordance with the temperature in the clutch unit. In this manner, any reduction in transmittable torque due to an increase in the temperature of the viscous fluid will be compensated for.

SUMMARY OF THE INVENTION

In accordance with the present invention, a fluid friction clutch is provided, comprising a housing, the housing being substantially filled with a viscous fluid, a shaft disposed within the housing, and mutually interengaging inner and outer plates. The inner and outer plates are coupled to the shaft and the housing for rotation about an axis within the housing. The inner and outer plates are spaced apart from each other so as to define gaps between themselves and spacers are provided within the gaps. The inner and outer plates are rotationally coupled to each other by the viscous fluid contained within the gaps and in addition are axially displaceable to vary the magnitude of the gaps. Temperature responsive means connected to the inner and outer plate elements are also provided in the fluid friction clutch. The temperature responsive means act to reduce the magnitude of the gaps between the plates when the temperature of the viscous fluid rises. Conversely, the temperature responsive means act to increase the magnitude of the gaps between the plates when the temperature of the viscous fluid decreases.

In one embodiment, the temperature responsive means comprise at least one expansion body which bears upon the inner or outer plate elements. The expansion body is made from a highly temperature sensitive material and is formed in such shape that it expands in an axial direction when the temperature in the friction clutch rises.

In this embodiment, the spacers disposed within the gaps are provided in the form of expanding springs, for example, annular disk springs. The spacers, together with the expansion element first define a gap width between the plates. If the temperature of the viscous fluid within the housing of the clutch increases, the spacers in the form of resilient springs are compressed by the increase in size of the expansion body. Thus, the drop in viscosity of the fluid is compensated for by the decrease in the size of the gaps.

In another embodiment, the spacers themselves comprise the temperature responsive means. In this embodiment, temperature sensitive spacers are disposed within the gaps, and a resilient axial support member bears upon the inner and outer plates. The spacers are constructed from a temperature sensitive material in such shape that they contract in the axial direction when the temperature inside the clutch rises. For example, the temperature sensitive spacers may comprise bimetallic conical rings which can be disposed within the gaps so that they contract in the axial direction when the temperature rises. The resilient axial support member which bears upon the plates thus ensures that the gaps between the plates will decrease in size when the temperature rises.

Various temperature responsive bodies may be used in connection with this invention. For example, substantially conical bimetallic rings may be employed as the temperature sensitive spacers. A wax element may be used as the expansion body of the first embodiment. Similarly, the expansion body may be constructed in the form of a pressure spring made from a memory alloy. As is known to those skilled in the art, such memory alloys include nickel-titanium, copper-zinc-aluminium, and copper-aluminium-nickel alloys.

It should be understood that the temperature responsive means of the present invention will also act to decrease the spacings between the plates when a drop in the temperature of the viscous fluid occurs.

BRIEF DESCRIPTION OF THE DRAWINGS

FIG. 1 illustrates, in a sectional view, a fluid friction clutch in accordance with the present invention.

FIG. 2 illustrates a second embodiment of the present invention.

FIG. 3 illustrates a third embodiment of the present invention.

DETAILED DESCRIPTION OF THE PREFERRED EMBODIMENTS

Referring to the drawings, wherein like numerals refer to like elements, a fluid friction clutch of the present invention is illustrated. The fluid friction clutch includes a housing 1 filled with a viscous fluid and a shaft 2 which engages into or is mounted freely rotatable within the housing 1. Housing 1 and shaft 2 comprise the driving and the driven coupling members of the clutch. Housing 1 and shaft 2 have splines 3 or the like by means of which they are non-rotatably connected to driving and driven shafts (not illustrated).

Housing 1 and shaft 2 are coupled for rotation to each other by means of plates 4 and 5. As illustrated, plates 4 and 5 are interengaged or interleaved. Spaces or gaps are provided between plates 4 and 5, which gaps can be varied in size by axial displacement of plates 4 and 5.

Referring now to the embodiment illustrated in FIG. 1, spacers 6, in the form of temperature responsive bimetallic conical rings, are disposed within the gaps between inner plates 5. It is also possible to dispose spacers 6 within the gaps between the outer plates 4. A disk spring pack 7 is also provided which bears upon inner plates 5 in the axial direction.

As discussed above, spacers 6 change in form with increases in temperature. Thus, spacers 6 in the form of bimetallic conical rings, become flatter with increases in temperature in the viscous fluid. As a result, when the temperature of the viscous fluid rises, disk spring pack 7 bears upon the plates and causes the gaps between the plates to decrease in size, thus compensating for the temperature rise.

In a related embodiment of the invention, the spacers 6 may be formed as simple disk springs, while the individual element of spring pack 7 are formed as temperature responsive bodies. In this particular embodiment, spring pack 7 will expand in the axial direction, thus decreasing the gap width, when the temperature of the viscous fluid rises.

Referring now to FIG. 2, spacers 6' are provided as simple disk springs disposed in the gaps between inner plates 5. Inner plates 5 bear in the axial direction on a wax element 8. Wax element 8 is an expansion body characterized by a substantial form change when the temperature increases. When the temperature rises, the wax element 8 expands in the axial direction, thus compressing spacers 6' and the gaps between the plates.

FIG. 3 illustrates yet another embodiment of the present invention. In this embodiment, spacers 6', again in the form of simple disk springs, are disposed with the gaps between plates 5. A pressure spring 9 is provided which bears upon inner plates 5. Pressure spring 9 is made from a memory alloy, such as those mentioned above. At low temperature, the individual convolutions of pressure spring 9 bear practically free of tension on each other. However, when the temperature increases, the pitch of the convolutions increases substantially. The plates 5 are pressed together against the action of the annular disk springs 6' and their spacing is reduced.

While the invention has been described by reference to specific embodiments, this was for purposes of illustration only and should not be construed to limit the spirit or the scope of the invention.

What is claimed is:

1. A fluid friction clutch, comprising
a housing, said housing being substantially filled with a viscous fluid,
a shaft disposed within said housing,
mutually interengaging first and second plate elements, said first and second plate elements being coupled to said shaft and said housing respectively for rotation about an axis within said housing, said first and second plate elements defining gaps therebetween and being rotationally coupled to each other by said viscous fluid within said gaps, said first and second plate elements being axially displaceable to vary the magnitude of said gaps, and
spacers disposed within selected ones of said gaps, said spacers being made from a temperature responsive material, said temperature responsive spacers acting to reduce the magnitude of said gaps when the temperature of said viscous fluid rises and to increase the magnitude of said gaps when the temperature of said viscous fluid drops.

2. The fluid friction clutch of claim 1 further comprising a biasing member, said biasing member acting upon said first and second plate elements, said biasing member resiliently biasing said first and second plate elements to reduce the magnitude of said gaps.

3. The fluid friction clutch of claim 2, wherein said biasing member comprises spring elements.

4. The fluid friction clutch of claim 3, wherein said temperature responsive spacers are formed into a predetermined shape so that said spacers contract in the axial direction when the temperature of said viscous fluid rises and said spacers expand in the axial direction when the temperature of said viscous fluid drops.

5. The fluid friction clutch of claim 4, wherein said temperature responsive spacers comprise conical bimetallic rings.

6. The fluid friction clutch of claim 3, wherein said spring elements are made from a memory alloy.

7. The fluid friction clutch of claim 6 wherein said memory metal is selected from the group consisting of nickel-titanium, copper-zinc-aluminum, and copper-aluminum-nickel alloys.

* * * * *